р

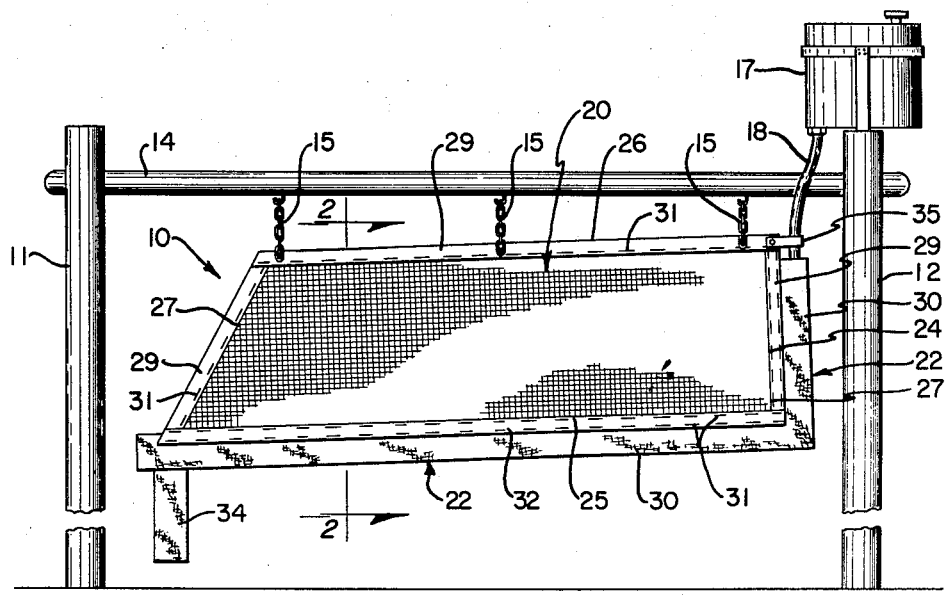
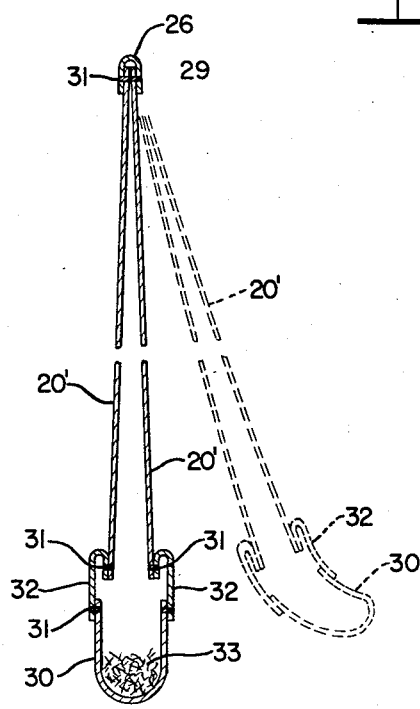

United States Patent Office 2,946,310
Patented July 26, 1960

2,946,310

INSECTICIDE APPLICATOR FOR ANIMALS

Raymond E. Rogers, P.O. Box 297, Denver, Colo.

Filed Nov. 18, 1958, Ser. No. 774,689

8 Claims. (Cl. 119—157)

This invention relates to a novel and improved applicator for the distribution of insecticide and the like to animals, and more particularly relates to an improved way of suspending and constructing an applicator for controlled but automatic transfer of the insecticide to the animal as it comes into contact therewith.

Insecticide applicators are commonly designed in the form of a barrier or gate wherein the applicating surface is suspended at some predetermined level by means of a freely swingable sheet or screen. Typical examples of a sheet or curtain type of applicator are shown and described in U.S. Patents No. 2,758,567 to Rogers et al. and No. 2,804,047 to Rogers. In the latter patent especially, there is disclosed the desirable utilization of a sheet which is preferably formed of a flexible open mesh material, such as screen wire, which will give the appearance of a barrier to an animal so that it will instinctively lower its head to pass under the applicator surface, yet the screen will also properly support or suspend the applicator surface to dispense insecticide onto the hide of the animal. Moreover, on account of the perforated or open construction, the wind will not tend to swing the applicator up so as to prevent proper wiping action for dispensing the insecticide.

In actual practice, however, it has more recently been found that the use of a single screen or sheet is not always effective alone to provide the necessary support and wear resisting qualities, especially in the heavy duty applicator constructions necessary for the larger animals. Attempts to substitute heavier gauge or stronger wire were found to be generally unsatisfactory since the openings were either too large or for the same size openings the screen was unduly rigid and heavy. At the same time, welding or otherwise fastening two or more lightweight screens together was found to be unsuitable since the resultant screen possessed the same undesirable characteristics.

In accordance with the present invention, it is proposed to substitute for a single lightweight screen a plurality of screens only partially secured together and in such a way as to cooperate in properly supporting the applicator surfaces and to greatly increase the wear resistance and life of the assembly as a whole, especially the screen, and yet the screen layers or plies will be independently or relatively movable to an extent sufficient so as not to substantially decrease the resiliency and flexibility over that previous obtainable with a single lightweight screen. In addition, the applicator surfaces are supported in a unique and improved way so as to incur more uniform and faster distribution of the insecticide throughout.

Accordingly, it is a primary object to provide in an insecticide applicator for animals an improved way of suspending the applicator so as to yieldingly but firmly contact the back and sides of the animal as the animal passes under the applicator and wherein the applicator surface is adapted to distribute the insecticide in a quick and uniform manner.

It is another object to provide for an improved screen type of insecticide applicator for animals in which the screen support is so constructed and arranged as to secure additional wear resistance and support to withstand constant or intermittent engagement with the animals without unduly stiffening the applicator.

It is a further object to provide in an insecticide applicator for animals an improved wear resistant screen constructed of open or perforated material such as woven wire or synthetic material wherein the screen is comprised of at least two plies of material connected in such a way as to operate together to provide additional support and wear resistance, and at the same time the plies are independently movable to an extent sufficient to prevent creasing or crimping of the adjacent plies, and in general to insure the same resiliency afforded by a single ply.

The above and other objects of the present invention will become more apparent from the following description taken together with the accompanying drawings, in which:

Figure 1 is a front view of a preferred form of applicator in accordance with the present invention; and Figure 2 is an enlarged cross sectional view of the screen construction in accordance with the present invention.

Referring more particularly to the drawings, there is shown by way of illustrative example in Figure 1 a typical applicator 10 of the sheet or screen type for suspension between suitable end supports, such as the posts 11 and 12 which in a well known manner form a gate or gap in a fence, through which the animals may pass. The applicator may be suspended therebetween by suitable means such as a cross bar 14 with a plurality of pendant members in the form of chains 15 or the like serving to fasten the top edge of the applicator to the cross bar in desired disposition. To supply insecticide to the applicator a liquid supply such as a pour can or tank 17 filled with insecticide may be secured to the upper end of the post 12 together with a flexible tube 18 extending downwardly from the can 17 to supply insecticide by gravity action into the applicator. If desirable, flow of insecticide from the tube 18 to the applicator may be suitably controlled by means of a valve structure, not shown, but which preferably is of the type described in U.S. Patent No. 2,758,567 to Rogers et al.

A primary feature of the present invention is the construction and design of the applicator 10, especially the sheet or screen section as shown at 20. As mentioned, the screen is preferably of a wire mesh material and of a screen size so as to prevent undue swinging as a result of the wind, yet small enough to avoid accidentally catching the sharp horns of an animal. In addition, the screen section must be of sufficient strength to securely support liquid conducting applicator surfaces 22 extending at least along one side 24 and bottom 25 of the screen sections with little strain being imposed on the screen so as to insure greatest wear resistance and life. However, the screen must possess a sufficient amount of resilience and flexibility to bend easily as the animals contact it without creasing or in any way misshaping the applicator. Also, from the standpoint of wear, it is of course desirable to prevent creasing since continual working and bending of the screen at the creased portion would very likely lead to early failure. To this end the screen section 20 is comprised of at least a pair of wire mesh screen layers 20' of generally rectangular form with preferably the top edges, as at 26, and side edges 27 away from the liquid tank 17 of each screen layer secured together such as by means of a weld or fastener not shown with covering strips of canvas 29 applied over the edges 26 and 27, respectively.

As shown in more detail in Figure 2, opposite side edges 24 and bottom edges 25 are not secured together, for in this way it has been found that notwithstanding the increased support provided by the extra layer or layers of wire screen material, there is a relatively small increase in rigidity of the screen section as a result of the free relative movement of the layers as the animals bend and swing the screen upwards in passing beneath it. In this connection it will be evident that either or both side edges 24 and 27 may be left free, together with the bottom edges 25, although it is preferred to secure at least one side together such as at 27 in order to prevent any tendency of the layers to pull away from one another.

The applicator surface 22 may be composed of pliable absorbent materials such as canvas, burlap or various synthetic fibrous materials having good wear resistant properties. The surface 22 is preferably in the form of an elongate strip extending along the side 24 and bottom 25 and as shown is connected to the respective edges in such a way as to allow the screen layers to move independently of one another. For this purpose the surface 22 may be formed of a burlap strip 30 with each longitudinal edge individually secured to a respective edge of each screen layer, preferably by means of a canvas strip 32. Each canvas strip 32 may be doubled over with the outer portion secured to the edge of the burlap strip (by stitching or otherwise) and the inner portion secured to the edge of the screen layer by suitable fastening means such as staples 31. In this way the surface 22 forms a channel in which, if desired, additional absorbent material 33, such as wool fibers or cotton batting, may be disposed which together with the burlap strip will act to absorb a considerable amount of liquid insecticide for transfer to the animals. In addition, a strip or strips of absorbent material such as at 34 may be suitably secured to the surface 22 to hang down therefrom for the purpose of applying insecticide to the sides and legs of the animals and is adapted especially for the smaller animals not able to contact the surface 22.

As further shown in Figure 1 the flexible tube 18 extends downwardly into the channel formed by the strip 30 to supply a controlled amount of insecticide and the tube may be secured in position within the channel by suitable means as illustrated in said patents or by metal strip means 35 extending from the top of the screen and thus prevent accidental displacement of the tube from the channel. In addition, to encourage optimum distribution of the insecticide for saturation of the applicator surface, the bottom section may be sloped downwardly away from the liquid supply side so that the liquid will saturate the absorbent material by a combination of gravity and capillary action. The inclination of the bottom of the applicator may be regulated by increasing the length of the chains 15 away from the supply side, as in Figure 1, so that the applicator may be adjusted both in height and inclination merely by varying the length of the chains 15.

The applicator is of course suspended at a level such that the animals will contact the bottom portion of the applicator and the applicator surface will drag over the hides of the animals and in this way deposit the insecticide on their hair and skins. In passing underneath the applicator the animals will in addition exert an upward force on the applicator so as to swing and bend the screen section 20. Due to the ability of the screen layers to move independently as they are bent, there will be no danger of creasing, crimping or pinching between the layers and also they will be sufficiently flexible as individual layers to offer minimum resistance to the animals passing underneath. The inner sloping of the side edges 27, of course, contributes to the overall flexibility of the unit, as do the chains 15. In this connection the relative movement between the screen layers will also cause working back and forth of the applicator surface so as to exert a limited squeezing action on the absorbent material and thus insure more efficient and uniform distribution of the insecticide.

It will be apparent that the applicator 10 may assume various shapes and configurations other than the generally rectangular shape illustrated. Also that the number of screen layers to be utilized will be dictated by the size and overall weight of the application, and in this connection the screen or sheet may be formed of various materials, as mentioned, and need not necessarily be a wire mesh material, but the screen section should be perforated in some way so as not to be affected by the wind and to permit the animals to see through it. Moreover, the applicator surface 22 may border any number of sides of the screen section, although of course the most effective areas are the side leading from the supply source and the bottom. It would be possible to directly connect burlap 30 to the screens 20 and 20' by means 31, but it is by far preferable to utilize canvas 32 for, among other reasons, the canvas wears longer than the burlap and in the latter connection the burlap 32 may be readily replaced when necessary.

Accordingly, various modifications in the construction and design of the applicator of the present invention may be made without departing from the scope thereof, as defined by the appended claims. For example, both side edges could be arranged to inwardly slope as at 27 to contribute to the overall flexibility as well as to provide less area exposed to wind conditions. It also should be clear that the amount of burlap 30 on side 24 will vary in accordance with the size and length of extension or conduit 18. As to the two layers of open flexible material, such is meant to include a single piece bent over or folded in two whereby the top of the fold would be the top 26. Similarly, the described embodiment refers to securing together the top edge 26 and this is meant to include the fold-over arrangement, riveting and stapling to pipe strapping or the like and connection to a durable piece of canvas or the like whereby there would be independency between the top edges of the sheets 20'. It should also be mentioned that Figure 2 is a greatly exaggerated view, this being done to more easily explain the invention. In actuality, for example, the layers of each of the loops formed at the top of canvas 32 would be in abutting relation and the fastening means, such as stitching, would pass through both layers. Also the top strips of burlap 30 would be abutting and, if desired, even stitched together at spaced intervals. In other words, unless the view of Figure 2 were greatly exaggerated it would be difficult to draw lines showing the separate elements.

What is claimed is:

1. In an insecticide applicator for animals having end supports and a source of insecticide supply, the combination of a generally rectangular sheet member suspended between said end supports including at least two coextensive but separate layers of open flexible mesh material with the top edges of said layers being secured together, liquid absorbent conducting means extending at least along the bottom edges of said layers in communication with said insecticide supply source, and the bottom edges of said layers being independently connected to said conducting means to provide for relative movement between said layers upon bending.

2. In an insecticide applicator according to claim 1 wherein said sheet layers are composed of wire screen material.

3. In an insecticide applicator according to claim 2 wherein said liquid conducting means is composed of an elongate burlap strip extending along the free side edges and bottom edges of said screen layers with the longitudinal edges of said strip being independently secured to an edge of said screen layers.

4. In an insecticide applicator according to claim 1 wherein at least one side of said layers extends upwardly and inwardly from the bottom to the top of said layers.

5. A liquid insecticide applicator for animals comprising a liquid insecticide supply source, a screen section defined by at least two layers of flexible wire mesh material, means for suspending said screen between a pair of end supports a predetermined height above the ground, said screen layers being secured together along the top thereof, an elongate strip of liquid absorbent material extending along at least one side and free bottom edges of said screen section, and flexible joining strips for individually fastening each longitudinal edge of said elongate strip to an edge of said screen layers.

6. A liquid insecticide applicator according to claim 5 wherein the secured side edges of said screen layers are inclined upwardly and inwardly from the bottom to the top thereof.

7. A liquid insecticide applicator according to claim 5 wherein said means for suspending said screen section include a cross bar connected between the end supports and a plurality of pendant members connected between said cross bar and said screen section.

8. A liquid insecticide applicator according to claim 7 wherein said pendant members are defined by a plurality of chain members being variable in length from one side of said screen section to the other to incline the bottom of said screen section so as to establish movement of the insecticide by gravity throughout said elongate strip.

References Cited in the file of this patent

UNITED STATES PATENTS

| | | |
|---|---|---|
| 2,804,047 | Rogers | Aug. 27, 1957 |
| 2,814,272 | Worden | Nov. 26, 1957 |